United States Patent

[11] 3,630,541

| [72] | Inventors | Charles A. Carlson<br>Fort Wayne;<br>William S. Locke, Hamilton, both of Ind. |
|------|-----------|---|
| [21] | Appl. No. | 45,467 |
| [22] | Filed | June 11, 1970 |
| [45] | Patented | Dec. 28, 1971 |
| [73] | Assignee | International Harvester Company<br>Chicago, Ill. |

[54] VEHICLE AXLE SUSPENSION
14 Claims, 6 Drawing Figs.

[52] U.S. Cl. .................................................. 280/124,
267/15, 267/52
[51] Int. Cl. .................................................. B60g 11/26
[50] Field of Search ..................................... 267/15 R,
15 A, 52, 21; 280/124

[56] References Cited
UNITED STATES PATENTS

| 2,280,347 | 4/1942 | Olley | 267/52 |
| 3,437,333 | 4/1969 | Koch | 267/52 |
| 3,494,609 | 2/1970 | Harbers | 280/124 |

*Primary Examiner*—Philip Goodman
*Attorney*—Floyd B. Harman

ABSTRACT: A vehicle axle suspension system including an air spring and a pair of trailing arms, beams, or the like for suspending the chassis frame of a motor truck or trailer from the rear axle or axles whether the latter be a single driving or a single trailer axle, two driving or two trailer axles, or a driving and a trailing axle. The vehicle axle suspension system further includes improved means for connecting each end of an axle housing to a respective trailing arm which means includes a resiliently mounted axle housing support or saddle and which means allows limited relative movement in certain directions between the trailing arms and the axle housing but at the same time prevents relative fore and aft movement between the trailing arms and axle housing.

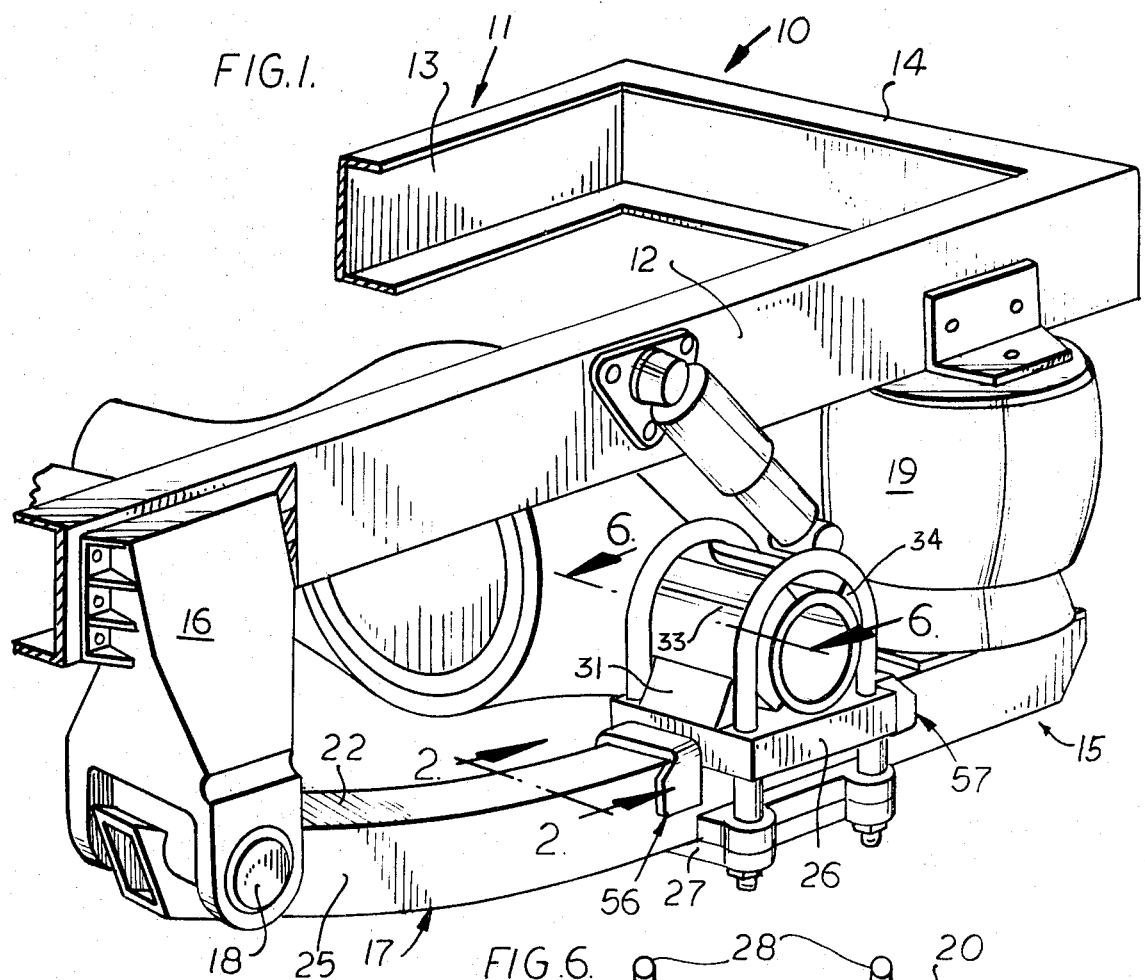
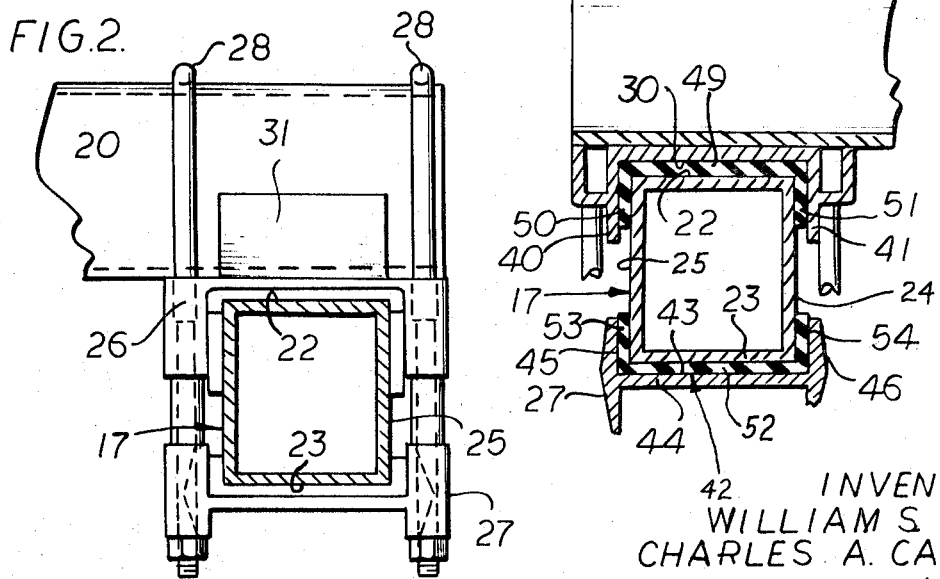

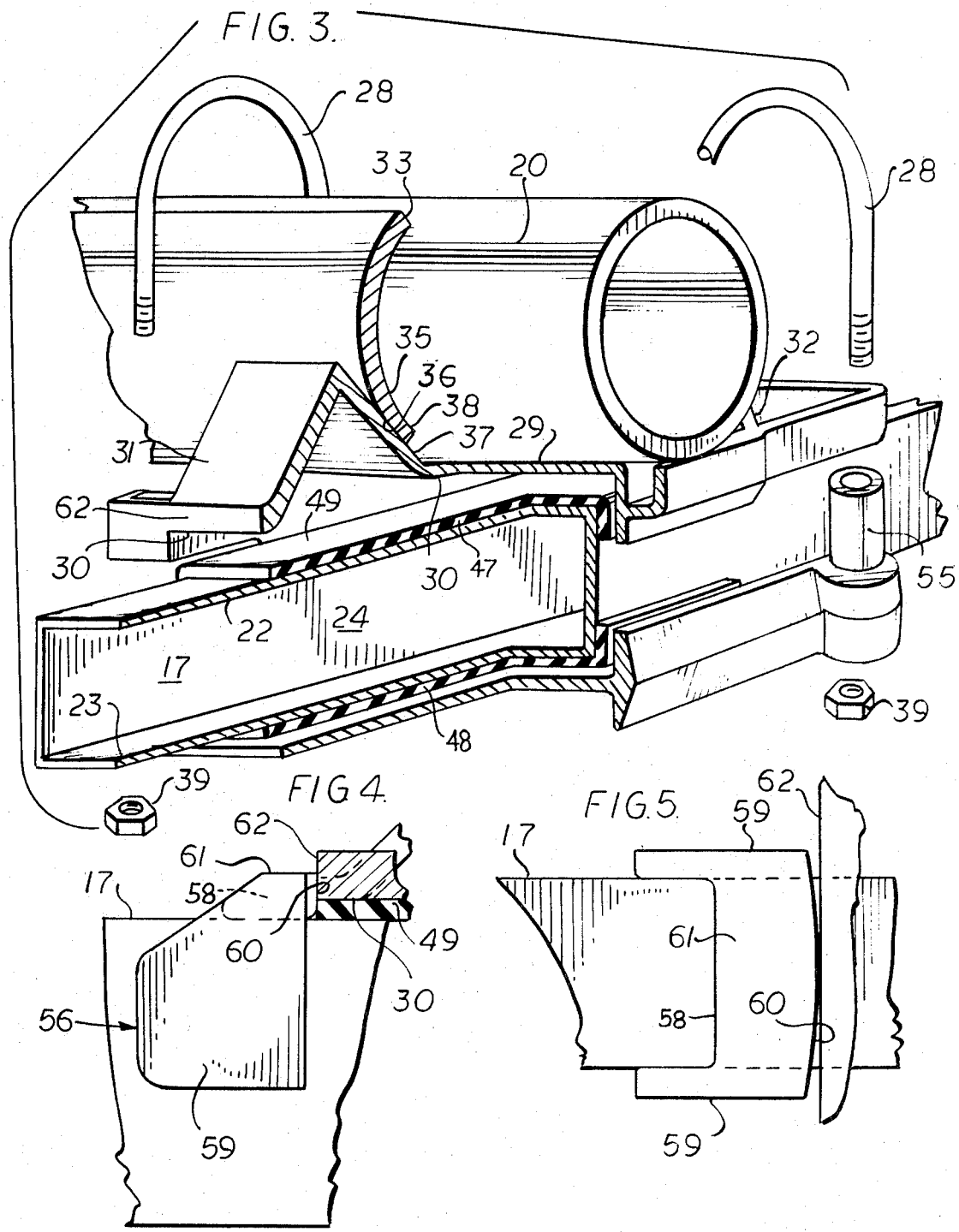

VEHICLE AXLE SUSPENSION

This invention relates to vehicle air spring axle suspension systems and, more particularly, to new and improved means for connecting an axle housing to a control or trailing arm.

The axle suspension system of the present invention involves a pair of air spring means transversely spaced and disposed at respective opposite sides of the chassis frame of the vehicle. Each respective air spring is interposed between the vehicle chassis frame and a control arm in the form of a trailing arm, walking beam, bolster or the like to which a related end of the axle housing is attached. The trailing arm, in turn, is pivotally connected to the chassis frame. Inasmuch as the air spring structures generally employed in axle suspension of the air spring type to which the present invention relates are generally incapable, per se, to impart the necessary roll stability to the vehicle with which they are associated, some form of mechanical means for controlling all lateral forces and force components on the suspension and its various members must be provided. Heretofore, such mechanical means have taken the form of relatively complicated systems of torque rods, later stabilizer bars, bolsters, and the like. Accordingly, it is an important object of the present invention to provide an air spring axle suspension wherein much of the lateral force is controlled by the provision of strong, relatively rigid connections between the axle housing and the walking beams, or trailing arms, or other control arms so as to impart the desired roll stability to the axle suspension. However, simultaneously the connections also afford sufficient controlled flexibility between the axle housing and the control arms in certain directions so as to prevent stress buildup in the suspension under extreme loading conditions.

The primary objective of the present invention is to provide a relatively simple, but sturdy and inexpensive, axle suspension system which will impart roll stability to the vehicle with which it is associated and also has incorporated therein means for permitting a predetermined controlled amount of articulation or one wheel bump capability between the axle and the vehicle chassis frame. The structure of the vehicle axle suspension system of the present invention adequately controls all of the forces to which the usual air spring suspension is subjected during operation of the vehicle with which it is associated other than the vertical forces controlled by the air springs themselves.

The present invention is particularly adaptable for use in conjunction with air springs and may be used in a single axle arrangement as well as in a tandem axle arrangement. In the latter arrangement, the invention herein would be particularly useful because it would allow the axle with which it is used to provide the desired roll stability for the vehicle while the other suspension associated with the other axle could provide maximum articulation for the vehicle.

A principal object of the present invention is to provide a vehicle axle suspension system wherein the axle housing is supported at transverse opposite ends by a pair of control or trailing arms, the attaching or connecting means or joint between each trailing arm and a respective end of the axle housing being so constructed that the overall effect is to impart good roll stability to the vehicle.

A still further objective is to provide in a vehicle axle suspension an arrangement wherein the vehicle axle housing is supported by means of a pair of control or trailing arms and air spring means interposed between the trailing arms and the vehicle chassis frame and wherein the connection means between each trailing arm and a respective axle housing end contribute to allow a predetermined, limited and controlled amount of articulation of the axle housing with respect to the vehicle chassis frame as well as to impart good roll stability to the vehicle.

The invention contemplates the provision of use of unique connections between the control arms and the axle housing which are capable of preventing or relieving stress buildup in the components of the suspension structure when subjected to extreme loading conditions without sacrificing roll stability of the vehicle. The aforementioned objectives of the invention are achieved by a unique attaching or connecting means for fastening the ends of the transversely extending axle housing to a pair of control or trailing arms which, in turn, are pivotally connected to the chassis frame. The novel attaching or connecting means at each axle housing end involves a set of pads of rubber or rubberlike material oriented and associated with an axle saddle bracket and a clamping bracket and one end of a control or trailing arm in such a manner that articulation to a limited degree between the control or trailing arm end and the axle housing end is possible. The rubber pads, which are assembled with a predetermined preload, distort resiliently when the connecting means articulates and are sized, shaped and positioned so as to provide a generally predetermined resistance to such articulation in substantially all directions. Vertical movement between the control arm end and the axle housing end is limited by the high compressive rate of an entire rubber pad in contact with the bottom or top of the control arm. Braking torque is resisted by the compressive rate of the top forward and bottom rear sections of the rubber pads whereas acceleration torque is resisted by the compressive rate of the bottom forward and top rear sections of the rubber pads. The rubber pads partially embrace the transverse sidewalls of the control arm end and lateral loads are resisted by the compressive rate of the sections of rubber material which are wrapped around the sides of the control arm end and contact certain related surfaces of the axle saddle and clamping bracket. Rolling of the control arm in the connection or joint is resisted by the compressive rate of the rubber pad sections disposed between and abutting the sides of the trailing arm and respective surfaces of the axle saddle and axle clamp where top outside, bottom inside or top inside, bottom outside provide the resisting couple depending on roll direction. Control or trailing arm yaw is resisted by the compression rate of the wrapped rubber where the front outside, rear inside of both the upper and lower rubber pads provide a couple to resist clockwise yaw of the control arm viewed from above and similar forces resist counterclockwise yaw. Stop means are incorporated into each attaching or connecting means for providing positive fore and aft restraint of the axle housing end with respect to the control arm end while allowing the aforementioned limited relative lateral, vertical, roll and yaw movements therebetween.

The foregoing and other important objects and desirable features inherent in and encompassd by the invention, together with many of the purposes and uses thereof, will become readily apparent from the reading of the ensuing description in conjunction with the annexed drawings, in which:

FIG. 1 is a perspective view of a portion of a vehicle axle suspension structure embodying the principles of the invention;

FIG. 2 is a vertical sectional view taken substantially along line 2—2 of FIG. 1;

FIG. 3 is an enlarged, broken away, partially exploded perspective view showing the manner in which the axle housing is connected to a trailing arm;

FIG. 4 is a fragmentary side elevational view of a stop member positioned on the trailing arm, a portion of the structure is broken away to better illustrate the invention;

FIG. 5 is a partial plan view of the structure shown in FIG. 4; and

FIG. 6 is a vertical sectional view taken substantially along line 6—6 of FIG. 1.

Referring to the drawings in detail, wherein like reference characters represent like elements throughout the various views, reference numeral 10 designates the rearwardmost end portion of a motor vehicle, such as a motor truck or the like. The vehicle 10 includes a chassis frame 11 which, in turn, comprises a pair of longitudinally extending, transversely spaced side sill members 12, 13 of a conventional channel or U-shape. The side sill members 12 and 13, partially shown in FIG. 1, are interconnected by means of a plurality of longitudinally spaced, transversely extending crossmembers, one of which is shown in FIG. 1 and designated by reference numeral 14. Ground engaging wheels, not shown, are suspended from the chassis frame 11 by means of a vehicle axle suspension system, designated in its entirety by reference numeral 15. Only the structure of the axle suspension system 15 disposed on one side of the longitudinal median line of the chassis frame 11 will be described in detail hereinafter but it is to be understood that the vehicle axle suspension structure disposed on the opposite side of such median line and not shown is substantially a mirror image of the axle suspension structure and components shown and to be described in detail. While only a single axle vehicle is shown, it is to be understood that in a tandem axle arrangement the axle housing shown could be the housing for the rear axle and a similar axle housing (not shown) would be disposed forwardly of the illustrated axle housing to accommodate the forward rear axle of the tandem axle unit.

The chassis frame 11 has a depending bracket 16 rigidly secured to side member 12 to which one end of a respective control or trailing arm 17 is pivotally connected. The pivotal connection of the control or trailing arm to the bracket 16 is designated generally by reference numeral 18. The pivotal connection 18 secures the forwardmost end of the trailing arm 17 to the bracket 16 so as to allow vertical pivotal or rocking movement of the trailing arm 17 with respect to the chassis frame 11. An air spring unit designated generally by reference character 19, which may be of any conventional well-known type, is operatively interposed between the chassis frame side sill member 12 and the rearwardmost end section of trailing arm 17 or end opposite the pivotal connection 18. The air spring unit 19 functions in the usual manner to cushion the chassis frame 11 and substantially prevent the transmission of vertical shocks from an axle housing 20 to the chassis frame 11. The axle housing 20 extends transversely of the chassis frame 11 and is capable of rotatably supporting a wheel axle (not shown) therein.

An axle end attaching or connecting means, designated in its entirety by reference numeral 21, is employed for operatively fastening a respective end of the axle housing 20 to the trailing arm 17 at a point adjacent to the air spring unit 19. The trailing arm 17 is preferably in the form of a metal tubular structure having a generally square cross section so as to provide vertically spaced, substantially parallel top and bottom wall surfaces 22 and 23, respectively, and transversely spaced, substantially parallel inner and outer sidewall surfaces 24 and 25, respectively. However, it is to be understood that the trailing arm 17 could be made solid rather than hollow without departing from the spirit and scope of the invention.

The axle end connecting means 21 provided for attaching each end of the axle housing 20 to a respective trailing arm 17 includes an axle saddle 26, a clamping bracket 27, and a pair of U-bolts 28 which partially encircle the end of the axle housing 20 with the legs thereof extending generally vertically through the saddle 26 and clamping bracket 27. The terms "axle saddle" and "saddle" are used for convenience and brevity throughout the patent specification and are to be considered as synonyms of the term "axle housing saddle" since, as illustrated in the drawings, the ends of the axle housing 20 rather than the axle per se rest in the saddle 26. As best shown in FIG. 3, the axle saddle 26 is positioned upon the top of the trailing arm 17 and is preferably formed with a platelike portion 29, the central underside of which is defined by a generally horizontally disposed substantially flat surface 30. The platelike portion 29 of the axle saddle 26 is provided with transversely extending, longitudinally spaced axle housing retaining portions 31, 32 which project vertically upwardly. The retaining portions 31 and 32 which preferably have an inverted V-section shape are formed out of or attached to the platelike portion 29 by welding or other suitable means. The inverted V-section retaining portions 31, 32 serve as a seat for supporting an end of the axle housing 20. Preferably a pair of wedge elements 33, 34, which are welded to the housing 20, are employed for facilitating clamping of the axle housing end.

Each element 33, 34 has a wedge portion 35 provided with an outer surface 36 adapted to slidingly engage the upwardly facing inclined surface 37 of a respective retaining portion 31 or 32. The inwardly facing surface 38 of each wedge element 33, 34 is adapted to be fixedly secured to the axle housing end. The wedge elements 33 and 34 may be sized as desired whereby various axle housing sizes may be accommodated between the retaining portions 31 and 32. It will be appreciated from the foregoing that upon tightening of the locknuts 39 associated with the U-bolts 28, the wedge elements 33 and 34 are caused to firmly wedge into engagement with the saddle retaining portions 31 and 32. It will also be appreciated that since the means for rigidly connecting the axle housing 20 to the saddle 26, as well as the shape or form of the axle housing 20, per se, form no part of the present invention, the housing 20 could be rectangular or square in shape and means other than those described above for rigidly connecting the axle housing 20 to the saddle 26 could be employed within departing from the spirit and scope of the invention.

As best shown in FIGS. 3 and 6, the underside of the saddle 26 is somewhat channellike in shape with the legs of the channel being defined by a pair of transversely spaced longitudinally extending side flanges 40, 41, which depend from the undersurface 30 of the platelike portion 29. The clamping bracket 27 is also formed with a channellike pocket or seat 42 defined by an upwardly facing surface 43 of a generally flat, horizontally disposed platelike portion 44 and a pair of transversely spaced, longitudinally extending upstanding flanges 45, 46.

Resilient means in the form of upper and lower pads or blocks 47, 48, respectively, which are preferably made of rubber or other material having like physical properties. The upper pad 47 is disposed between the saddle 26 and the top of the trailing arm 17 and extends the full length of the saddle 26. It will be noted that the upper pad 47 is substantially U-shaped in vertical cross section with the bight portion 49 thereof interposed between the top wall surface 22 of the trailing arm 17 and the undersurface 30 of the axle saddle platelike portion 29. It will also be observed from viewing FIG. 6 that one leg 50 of the upper pad 47 is interposed between the depending side flange 40 and the outer sidewall 25 of the trailing arm 17 and similarly the other leg 51 of the pad 47 is interposed between the inwardly facing sidewall 24 of the trailing arm 17 and the depending side flange 41. In a similar fashion the trailing arm 17 is cradled in the clamping bracket 27. The bight portion 52 of the lower pad 48, which is also substantially U-shaped in vertical cross section, is sandwiched between the lowermost wall surface 23 of the trailing arm 17 and the upwardly facing surface 43 of the clamping bracket flat wall portion 44. The outermost leg 53 is interposed between the outwardly facing sidewall 25 of he trailing arm 17 and the upstanding flange 45. Similarly, the other leg 54 of the lower pad 48 is interposed between the inwardly facing sidewall 24 of the trailing arm 17 and the upstanding flange 46 of the clamping bracket 27.

From the foregoing, it will be appreciated that metal-to-metal contact between both the axle saddle 26 and clamping bracket 27 and the trailing arm 27 is effectively avoided. The purpose of the rubber pads 47, 48 will be pointed out presently. The assembly is secured in position by the U-bolts 28, which overlie the axle housing 20, extend through appropriate openings in the corners of the axle saddle 26 and the clamping bracket 27, and then are secured by locknuts 39. Preferably, the upper and lower pads 47, 48, respectively, are clamped by the U-bolts 28 to a preload controlled by four spacers, indicated by reference character 55, separating the axle saddle 26 and the clamping bracket 27. Each spacer 55 encircles a respective portion of a U-bolt leg and has one end abutting the axle saddle 26 and its opposite end abutting the clamping bracket 27. From the foregoing, it will be appreciated that the upper and lower pads 47, 48 allow limited freedom for the trailing arm 17 to move in all directions to prevent stress buildup under extreme loading conditions. Vertically, the travel between the trailing arm 17 and a respective end of the axle housing 20 is limited by the relatively high compressive rate of the bight portions 49, 52 of the upper and lower pads 47, 48, respectively, which are in abutting engagement with the bottom and top of the trailing arm 17. Braking torque is resisted by the compressive rate of the forwardmost section of the bight portion 49 of the upper pad 47 and the rearwardmost section of the bight portion 52 of the lower pad 48. Acceleration torque is effectively resisted by the compressive rate of the rearwardmost section of the bight portion 49 of the upper pad 47 and the forwardmost section of the bight portion 52 of the lower pad 48. Lateral loads are resisted by the compressive rate of the longitudinally extending legs 50, 51, 53, and 54 which are positioned, as pointed out hereinbefore, between the trailing arm sides and the axle saddle 26 and clamping bracket 27. Rolling of the trailing arm 17 in the joint is resisted by the compressive rate of the rubber material of the leg 50 and leg 54 or leg 51 and leg 53, depending on the roll direction, to provide a resisting couple. Trailing arm yaw is resisted by the compressive rate of the wrapped rubber where the forwardmost sections of the upper and lower outermost legs 50, 53 and the rearwardmost sections of the upper and lower innermost legs 51, 54 provide a force couple to resist clockwise yaw of the trailing arm 17 as viewed from above in FIG. 1. It is believed obvious that similar forces resist counterclockwise yaw.

Means are provided for positively preventing unwanted relative fore and aft movement between each trailing arm 17 and the axle housing 20. However, such means allows the controlled, limited relative movement between the trailing arm 17 and the axle housing 20, as pointed out above. The means for operatively connecting each trailing arm 17 to a respective end portion of an axle housing 20 includes a pair of longitudinally spaced, axle stop members 56 and 57. The axle stop members 56, 57 are substantially U-shaped in vertical transverse section, as clearly indicated in FIG. 1. It is to be understood that the axle stop members 56, 57 could be formed integrally with the trailing arm 17. The bight section 58 is positioned upon the wall surface 22 of the trailing arm 17 so as to be almost in abutting engagement with a respective end of the axle saddle 26. The laterally spaced, depending legs 59 of each axle stop member 56, 57 partially embrace the trailing arm 17 and the axle stop members 56, 57 are rigidly secured the trailing arm 17, as by welding or the like. As best shown in FIGS. 4 and 5, the bight section 58 of each axle stop member 56 and 57 is relatively thick and the surface 60 thereof almost in abutting engagement with a respective end of the axle saddle 26 lies substantially in a vertically flat, horizontally curved plane. A relatively small clearance is provided between the surface 60 of each axle stop member 56 and 57 and a respective end of the axle saddle 26 to allow articulation of the trailing arm 17 as will be described hereinafter. However, for all practical purposes, the stop members 56 and 57 are in solid contact with the saddle ends and, in effect, positively prevent fore and aft relative movement between the axle housing 20 and the trailing arm 17. The vertical dimension of each of the curved surfaces 60 is such that the topmost surface 61 of the bight section 58 is vertically spaced well above the undersurface 30 of the axle saddle 26. Consequently, when the axle saddle 26 is positioned upon the trailing arm 17 with the upper pad 47 interposed therebetween and the bight portion 49 thereof firmly clamped between the top wall surface 22 of the trailing arm 17 and the undersurface 30 of the axle saddle platelike portion 29, the edge surfaces 62, which lie substantially in transverse, vertical planes and define the forwardmost and rearwardmost extremities of the axle saddle 26, vertically overlap the curved surfaces 60 of the axle stop members 56, 57. Each curved surface 60 makes a substantially vertical line contact with a respective edge surface 62 of the axle saddle 26. From the foregoing, it will be appreciated that the longitudinally spaced axial stop members 56, 57 effectively provide fore and aft restraint of the axle saddle 26, which is rigidly secured to an axle housing end, while allowing limited vertical lateral and roll movements therebetween. Roll freedom is permitted by the axle stop members 56, 57 but such movement is limited and controlled by the compression of the pads 47, 48 as pointed out hereinabove. Yaw freedom is allowed by virtue of fact that the surfaces 60 are rounded or curved and cooperate with the substantially flat, transversely extending edge surfaces 62 of the axle saddle 26. It will be appreciated that the surfaces 60 are capable of "rolling" on the flat edge surface 62 during such roll and yaw movements. Lateral freedom is limited by compression of the upper and lower pads 47, 48, respectively, as pointed out hereinbefore. Since the axle stop members 56 and 57, which are rigidly secured to the trailing arm 17, are, for all intents and purposes, in metal-to-metal contact with the axle saddle 26 at all times, which is, in turn, rigidly secured to the axle housing 20, horizontal fore and aft forces are transmitted directly between the axle housing 20 and the trailing arm and not through the intermediary of rubber or the like.

From the foregoing, it will be appreciated that the above-described axle housing end connection construction, in effect, incorporates a predetermined or measured amount of articulation into the suspension which articulation incorporation is accomplished in a controlled manner without sacrificing vehicle roll stability. Because of the comparatively rigid characteristic and the degree of roll stability imparted to the axle suspension, the need for the usual torque rods, sway bars, or track bars commonly found in similar axle suspensions is greatly reduced, if not entirely eliminated. This is accomplished by isolating the trailing arm 17 from the axle saddle 26 in rubber or other resilient material rather than isolating the axle housing, per se, from the usual axle saddle in rubber.

What is claimed is:

1. Means for operatively interconnecting a laterally extending vehicle axle housing to an elongated beam means for limited, controlled relative movement therebetween comprising: attaching means for securing said axle housing to said beam means; resilient means operatively interposed between said axle housing and said elongated beam means, said resilient means being effective upon deformation to permit limited relative movement between said beam means and axle housing in certain directions; and positive stop means associated with one of said axle housing and beam means and operatively engageable with the other one of said axle housing and beam means to substantially prevent relative movement between said axle housing and beam means in a single direction generally along the longitudinal axis of said beam means.

2. Means for operatively interconnecting a laterally extending vehicle axle housing to an elongated beam means for limited, controlled relative movement therebetween as set forth in claim 1, wherein said beam means is in the form of a generally longitudinally extending trailing arm pivotally connected to the vehicle chassis frame for relative swinging movement; and said stop means includes a pair of longitudinally spaced axle stop member means fixed with respect to said trailing arm, said axle stop member means being effective to substantially prevent relative movement between said axle housing and trailing arm in a longitudinal direction.

3. Means for operatively interconnecting a laterally extending vehicle axle housing to an elongated beam means for limited, controlled relative movement therebetween as set forth in claim 1, wherein said attaching means includes axle saddle means, and means for rigidly securing said axle saddle means to said axle housing; and said positive stop means are associated with said beam means and operatively engageable with aid axle saddle means to substantially prevent relative movement between said axle housing and beam means in a single direction.

4. Means for operatively interconnecting a laterally extending vehicle axle housing to an elongated beam means for limited, control relative movement therebetween as set forth in claim 3, wherein said beam means is in the form of a generally longitudinally extending trailing arm pivotally connected to the vehicle chassis frame for relative swinging movement; and said stop means includes a pair of longitudinally spaced axle stop member means fixed with respect to said trailing arm, each said axle stop member means abutting a respective surface of said axle saddle means and said axle stop members being effective to substantially prevent relative movement between said axle housing and trailing arm in a longitudinal direction.

5. Means for operatively interconnecting a laterally extending vehicle axle housing to an elongated beam means for limited, controlled relative movement therebetween as set forth in claim 4, wherein said axle saddle means overlies said trailing arm; and said resilient means includes a pad of resilient material interposed between and abutting a surface of said axle saddle means and an upwardly facing surface of said trailing arm.

6. Means for operatively interconnecting a laterally extending vehicle axle housing to an elongated beam means for limited, controlled relative movement therebetween as set forth in claim 4, wherein said axle saddle means includes an axle saddle having a generally horizontally disposed downwardly facing surface and a pair of laterally spaced and parallel vertical surfaces depending from said downwardly facing surface, each of said vertical surfaces being positioned adjacent a respective surface of said trailing arm; and said resilient means includes a pad of resilient material interposed between and abutting said downwardly facing surface of said axle saddle and a substantially flat surface of said trailing arm, said resilient means further including a pair of laterally spaced pads of resilient material, each one of said pair of pads being interposed between and abutting a respective one of said vertical surfaces of said axle saddle and the trailing arm surface adjacent thereto.

7. Means for operatively interconnecting a laterally extending vehicle axle housing to an elongated beam means for limited, controlled relative movement therebetween as set forth in claim 2, wherein said attaching means includes an axle saddle overlying said trailing arm and having its longitudinal ends partially defined by substantially flat, laterally extending vertical end surfaces, and means for rigidly securing said axle saddle to said axle housing; and each of said axle stop member means includes a surface disposed closely adjacent to a respective one of said axle saddle vertical end surfaces.

8. Means for operatively interconnecting a laterally extending vehicle axle housing to an elongated beam means for limited, controlled relative movement therebetween as set forth in claim 7, wherein said surfaces of said stop member means disposed closely adjacent to said axle saddle vertical end surfaces lie in vertical, curved planes.

9. Means for operatively interconnecting a laterally extending axle housing to an elongated beam means for limited, controlled relative movement therebetween as set forth in claim 8, wherein said axle saddle has a generally horizontally disposed, downwardly facing surface, and said resilient means includes a pad of resilient material interposed between abutting said downwardly facing surface and upwardly facing surface of said trailing arm.

10. Means for operatively interconnecting a laterally extending axle housing to an elongated beam means for limited, controlled relative movement therebetween as set forth in claim 9, wherein said axle saddle has a pair of laterally spaced and parallel vertical side surfaces depending from said downwardly facing surface, each of said vertical side surfaces being positioned adjacent a respective surface of said trailing arm; and said resilient means further includes a pair of laterally spaced pads of resilient material, each one of said pair of pads being interposed between and abutting a respective one of said axle saddle vertical side surfaces and the trailing arm surface adjacent thereto.

11. Means for operatively interconnecting a laterally extending vehicle axle housing to an elongated beam means for limited, controlled relative movement therebetween as set forth in claim 10, wherein said attaching means further includes a bracket underlying said trailing arm; and said means for rigidly securing said axle saddle to said axle housing is effective to operatively secure said bracket to said trailing arm.

12. Means for operatively interconnecting a laterally extending vehicle axle housing to an elongated beam means for limited, controlled relative movement therebetween as set forth in claim 11, wherein said bracket is formed with a generally horizontally disposed, upwardly facing surface; and said resilient means further includes a second pad of resilient material interposed between and abutting said upwardly facing surface of said bracket and a downwardly facing surface of said trailing arm.

13. Means for operatively interconnecting a laterally extending vehicle axle housing to an elongated beam means for limited, controlled relative movement therebetween as set forth in claim 12, wherein said bracket has a pair of laterally spaced and parallel vertical side surfaces projecting upwardly from said bracket upwardly facing surface, each of said bracket vertical side surfaces being positioned adjacent a respective surface of said trailing arm; and said resilient means further includes a second pair of laterally spaced pads of resilient material, each one of said second pair of pads being interposed between and abutting a respective one of said bracket vertical side surfaces and the trailing arm surface adjacent thereto.

14. Means for operatively interconnecting a laterally extending axle housing to an elongated beam means for limited, controlled relative movement therebetween as set forth in claim 13, wherein said attaching means further includes a pair of substantially U-shaped bolts and cooperable locknuts, said bolts partially encircling said axle housing with the legs thereof extending through said axle saddle and bracket.

* * * * *